(12) United States Patent
Britz

(10) Patent No.: US 7,431,334 B2
(45) Date of Patent: Oct. 7, 2008

(54) VEHICLE OCCUPANT RESTRAINT DEVICE

(75) Inventor: Thomas Britz, Bessenbach (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 226 days.

(21) Appl. No.: 11/394,680

(22) Filed: Mar. 31, 2006

(65) Prior Publication Data

US 2006/0226642 A1  Oct. 12, 2006

(30) Foreign Application Priority Data

Apr. 7, 2005  (DE)  .................. 20 2005 005 466 U

(51) Int. Cl.
*B60R 21/26* (2006.01)
*B60R 21/276* (2006.01)

(52) U.S. Cl. .................. 280/736; 280/739; 280/742

(58) Field of Classification Search .............. 280/736, 280/739, 742
See application file for complete search history.

(56) References Cited

U.S. PATENT DOCUMENTS

| 5,366,242 | A | 11/1994 | Faigle et al. | |
|---|---|---|---|---|
| 5,645,297 | A * | 7/1997 | Rose et al. | 280/739 |
| 5,683,102 | A * | 11/1997 | Davis et al. | 280/732 |
| 5,743,558 | A * | 4/1998 | Seymour | 280/739 |
| 6,017,056 | A * | 1/2000 | Lee | 280/739 |
| 6,199,895 | B1 * | 3/2001 | Seymour | 280/728.2 |
| 6,241,279 | B1 * | 6/2001 | Ochiai | 280/735 |
| 6,540,257 | B2 * | 4/2003 | Magoteaux | 280/739 |
| 6,550,807 | B1 | 4/2003 | Faigle et al. | |
| 6,692,021 | B2 * | 2/2004 | Amamori | 280/739 |
| 6,752,420 | B2 * | 6/2004 | Ziolo et al. | 280/739 |
| 7,040,655 | B2 * | 5/2006 | Igawa et al. | 280/739 |
| 2004/0012180 | A1 | 1/2004 | Hawthorn et al. | |
| 2004/0021307 | A1 | 2/2004 | Ziolo et al. | |
| 2004/0056459 | A1 | 3/2004 | Kassman et al. | |
| 2006/0157959 | A1 * | 7/2006 | van Poppel | 280/735 |

FOREIGN PATENT DOCUMENTS

| DE | 4439123 | 5/1995 |
|---|---|---|
| DE | 29617586 | 3/1997 |
| DE | 19630855 | 7/1997 |
| DE | 19810537 | 9/1999 |
| DE | 10155858 | 6/2002 |
| DE | 10124273 | 11/2002 |

\* cited by examiner

*Primary Examiner*—Christopher Bottorff
*Assistant Examiner*—Joselynn Y. Sliteris
(74) *Attorney, Agent, or Firm*—Tarolli, Sundheim, Covell & Tummino LLP

(57) ABSTRACT

A vehicle occupant restraint device having a gas bag module includes a gas generator for inflating a gas bag, at least one discharge opening that is formed in a rigid component of the gas bag module, through which gas that is produced by the gas generator and conveyed into the gas bag can be discharged, and at least one closing device for the discharge opening. The closing device has an adjusting device and a plurality of covers of different pressure sensitivities. A specific one of said covers is placed in front of the discharge opening by the adjusting device even before the gas bag module is activated, so as to close the discharge opening until a pre-established gas bag interior pressure is reached that is associated with the specific cover, and, when this interior pressure is exceeded, to at least partially release the discharge opening through bursting.

12 Claims, 2 Drawing Sheets

VEHICLE OCCUPANT RESTRAINT DEVICE

TECHNICAL FIELD

The present invention relates to a vehicle occupant restraint device having a gas bag module.

BACKGROUND OF THE INVENTION

Usually in a vehicle occupant restraint device of this type, a gas bag is to be inflated as rapidly as possible with gas that is produced by a gas generator. However, in certain cases, it is desirable not to inflate the gas bag with the entire available gas volume or, more generally, to discharge gas, discharge openings, whose release makes it possible to limit the pressure in the gas bag, being provided in the gas bag module for this purpose.

In the literature, numerous solutions are described that have the goal, in the event of an accident, of regulating the interior pressure and thus the restraining effect of the gas bag as a function of the load condition, possible control parameters being the mass of the person being protected or the travel velocity, to name but a few. Among the solutions are apparatuses having rotating or sliding valves, which regulate the gas flow. Another approach, disclosed in DE 198 10 537 A1, lies in limiting the gas flow from the gas generator into the gas bag as a function of the load condition, in that a valve is activated by an adjusting means during driving, before an accident takes place.

Another solution provides for limiting the achievable interior pressure by creating a (further) discharge opening in the gas bag, in addition to any already present, and to close it off using a diaphragm. The diaphragm will then burst in response to a specific pressure, and gas can be discharged from the gas bag (for example, DE 296 17 586).

One disadvantage in the valve solutions that are known from the prior art lies in the fact that they generally can only be realized at significant manufacturing expense. If the goal is to regulate the flow of gases from the gas bag, there is also the problem of the very short response times that are required by the regulator, because the entire process during which the gas bag inflates and the occupant plunges into it and is thrown back takes less than 150 ms. On the other hand, if the attempt is made to control or to regulate the quantity of gas that flows into the gas bag by limiting the gas flow by a valve, then the inflation time is also increased, so that the person being protected may be provided with the full restraining effect only at a later point in time. Solutions that operate on the basis of a bursting diaphragm do not have the problem of response times, but they also do not represent regulating functions in the true sense of the word because they only react to a threshold value, i.e., when a specific interior pressure is reached.

In contrast, the present invention provides a system that, on the one hand, reacts with extremely short response times to the interior pressure within the gas bag, which increases during the inflation process, and that, on the other hand, makes it possible to set the maximum permissible interior pressure in stepwise fashion as a function of the existing load condition.

BRIEF SUMMARY OF THE INVENTION

According to the present invention, this is achieved by a vehicle occupant restraint device having a gas bag module, comprising a gas generator for inflating a gas bag, at least one discharge opening that is formed in a rigid component of the gas bag module, through which gas that is produced by the gas generator and conveyed into the gas bag can be discharged, and at least one closing device for the discharge opening. The closing device has an adjusting device and a plurality of covers of different pressure sensitivities. A specific one of said covers is placed in front of the discharge opening by the adjusting device even before the gas bag module is activated, so as to close the discharge opening until a pre-established gas bag interior pressure is reached that is associated with the respective cover, and, when this interior pressure is exceeded, to at least partially release the requested interior pressure before being opened. Therefore, in the vehicle occupant restraint device according to the present invention, covers of different pressure sensitivities are employed in front of a discharge opening in a housing of the gas bag module, a generator support, or another rigid, in the sense of largely inflexible, component, in order to individually adjust the maximum possible interior pressure and therefore the hardness of the gas bag to the existing load condition, thus protecting the occupant from unnecessary injury. On the one hand, the interior pressure must be sufficient in order to prevent the body from coming into contact with the steering wheel, but on the other hand, an excessively hard gas bag would deform the body of the person being protected to a greater degree than necessary. Because the system according to the present invention does not limit the flow of gas from the gas generator into the gas bag, a rapid inflation of the gas bag is possible, so that the full restraining effect is available to the occupant at an early point in time. Furthermore, the system also makes it possible to react to different load conditions, since the extent of the restraining effect can be adjusted by varying the maximum interior pressure.

In order to achieve an optimal restraining effect, at least one sensor is preferably provided, which detects vehicle- or occupant-specific parameters, and a control unit that processes the parameters and drives the adjusting device. The occupant-specific parameters are, for example, the weight or size of the vehicle occupant, his sitting position, and whether he has fastened his seat belt or not. A vehicle-specific variable is, e.g., the instantaneous driving velocity. Thus even during driving, before an accident has happened, it is possible to place in front of the discharge opening the cover that provides the occupant with sufficient protection at the lowest risk of injury.

According to one preferred embodiment, the covers have different thicknesses, as a result of which the desired varying pressure sensitivity can be realized in a simple manner.

Advantageously, a pre-established bursting cross-section of the covers is the same. This cross-section will then correspond almost exactly to the size of the discharge opening that is provided in the rigid component and that therefore, when necessary, can be released over a large area.

The closing device preferably has a plate that has a plurality of openings, which are closed by an assigned cover before the respective gas bag interior pressure is reached. In this manner, an especially stable arrangement is achieved. Alternatively, it is also of course possible to provide a plate that is designed in one piece, or a diaphragm that is stretched on a frame, the plate or diaphragm being made up of a plurality of segments of differing thicknesses. In this context, the segments themselves constitute the covers.

The respective cover can be placed in front of the discharge opening by moving the plate. Of course, it would also be conceivable to move the discharge opening and to hold the cover motionless, since the important factor is the relative motion between the cover and the discharge opening.

According to a first embodiment, the plate is, e.g., roughly circular and is moved by the adjusting device in rotational fashion. The plate is then joined to the rigid component of the gas bag module by a rotating pin, which is positioned such that the individual openings of the plate, which are arranged on a partial circle, are placed over the discharge opening in the rigid component by rotating the entire plate.

According to another embodiment, the plate has, e.g., an elongated, rectangular shape and is moved by the adjusting device in translational fashion. In this case, the plate is attached to the rigid component of the gas bag module, for example by guide rails, so that the openings in the plate can be placed over the discharge opening through a lateral shifting. This embodiment distinguishes itself by an especially compact construction.

The adjusting device is preferably a mechanism that distinguishes itself by a simple design, low manufacturing costs, and low susceptibility to trouble.

To ensure that, after the bursting of the cover, gas can only escape into the exterior area from the interior of the gas bag module through that opening in the plate that is located within the segment that is over the discharge opening in the rigid component, the closing device has preferably at least one seal. This seal can be provided on the plate itself or on the rigid component of the gas bag module.

Advantageously, each cover is made up of one individual material piece. In this way, it is assured that when a cover bursts, the rupture does not expand to the covers that are arranged nearby and that are designed to burst only in response to a higher gas bag interior pressure.

The covers are preferably made of the same material. As covers, in particular diaphragms of varying thicknesses, for example metal foils or plastic films, can be considered.

DETAILED DESCRIPTION OF THE PREFERRED EMBODIMENTS

Figure 1:
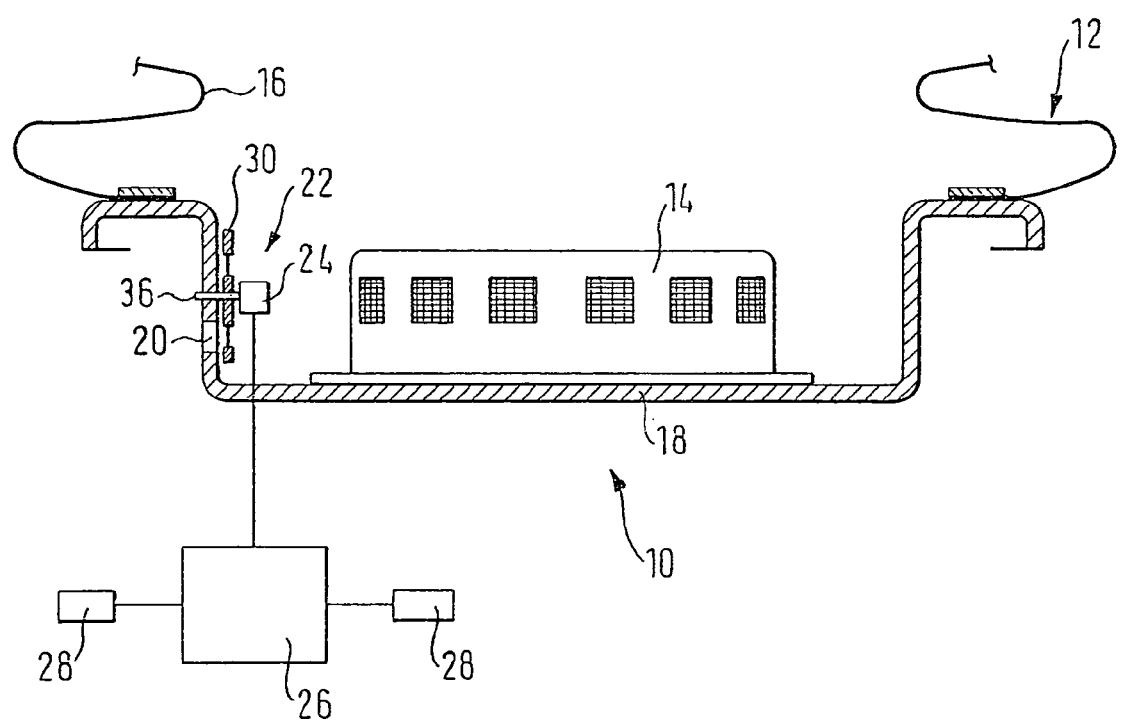
FIG. 1 depicts a schematic view of a vehicle occupant restraint device according to a first embodiment of the present invention, partially in sectional view.

FIG. 1 shows a vehicle occupant restraint device 10 having a gas bag module 12, which is more particularly designed for use as a driver-side gas bag module, but which is nevertheless not limited thereto. Gas bag module 12 has a gas generator 14 and a gas bag 16 that in the figure is only sketchily indicated. In a rigid component of gas bag module 12, in the form of a sheet-metal generator support 18, a discharge opening 20 is provided that is closed by a closing device 22. Instead of being arranged, as shown in FIG. 1, in a side wall, discharge opening 20 can of course also be arranged in the base of generator support 18. Gas bag 16 in any case is attached to generator support 18 such that an unhindered gas flow is ensured between the interior of the gas bag and closing device 22.

Closing device 22 includes an adjusting device in the form of a mechanism 24 that is driven by an electric motor and that is actuated by a control unit 26, which in turn is connected to a plurality of sensors of which only two sensors 28 are shown. Sensors 28 can be, for example, a mass sensor that is integrated in a vehicle seat or a velocity sensor that measures the velocity at a given moment.

Figure 2:
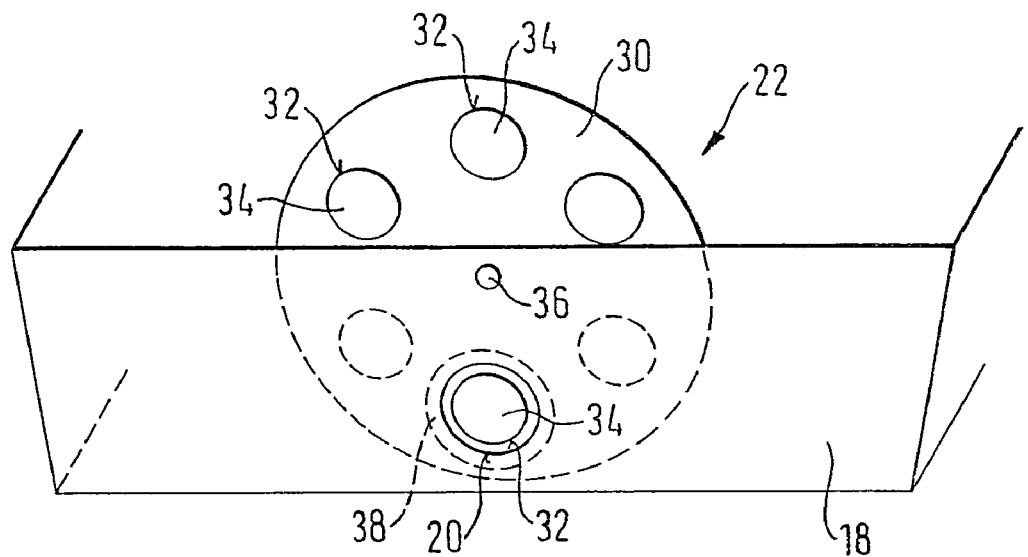
FIG. 2 depicts a lateral view of the vehicle occupant restraint device from FIG. 1.

In addition, closing device 22 includes a plate 30 (FIG. 2), which in the case of the first embodiment shown is configured in a circular shape and has a plurality of openings 32, each of which in the non-activated state of gas bag module 12 is closed off by a cover, or more precisely, is covered by a diaphragm 34, which constitutes the cover. Diaphragms 34 are all made of the same material, for example, a suitable metal foil or plastic film, and they have the same bursting cross-section, i.e., diameter. Because diaphragms 34 are nevertheless made having varying thicknesses, each diaphragm 34 has a different pressure sensitivity. In the embodiment shown, each diaphragm 34 is made of one separate material piece. However, it would also be equally conceivable to provide a plate that is subdivided into segments of varying material thicknesses and is otherwise executed in one piece.

When diaphragms 34 are acted upon by a pressure that increases over time, they will burst at differing pressures on the basis of their differing thicknesses.

Plate 30 is joined to generator support 18 by a rotating pin 36 and can be caused to rotate about this rotating pin 36 by mechanism 24. In this way, precisely one diaphragm 34 is placed between discharge opening 20 and the interior of gas bag module 12, discharge opening 20 being initially closed off by diaphragm 34. In this context, discharge opening 20 in generator support 18 is somewhat larger than openings 32 in plate 30.

Between rotatable plate 30 and the wall of generator support 18, in the area of discharge opening 20, at least one seal 38 is arranged, which provides that, after the rupture of diaphragm 34, gas can escape from the interior of gas bag module 12 only through that opening 32 in plate 30 that is situated over discharge opening 20 in generator support 18. Seal 38 is either attached to generator support 18 around discharge opening 20, or a seal 38 of this type can be provided on plate 30 around each one of openings 32.

During the operation of the vehicle, sensors 28 are constantly determining one or more vehicle- or occupant-specific parameters, such as the size of the vehicle occupant, his seating position, his weight, whether he has fastened his seat belt or not, as well as the driving velocity. On the basis of the accumulated data, control unit 26 calculates the optimal restraining effect for a case of restraint, as well as the minimum necessary gas bag interior pressure that will lead to the desired restraining effect. During the driving process, i.e., still before a possible impact, that diaphragm 34 that will provide the occupant with sufficient protection at the least risk of injury is placed in front of discharge opening 20 of generator support 18. This occurs by appropriately rotating circular plate 30 using mechanism 24.

In the case of restraint, gas that is produced by gas generator 14 flows into gas bag 16. The pressure in the interior of gas bag 16 as well as in the interior of gas bag module 12 increases more and more until finally a pressure is achieved that is sufficient to destroy diaphragm 34 that is disposed in front of discharge opening 20, thus releasing discharge opening 20. In this way, a softer gas bag is achieved, which will not deform the body of the person being protected to any greater extent than is necessary. By providing a plurality of diaphragms of varying thicknesses, which therefore burst at different pressures, the maximum possible interior pressure and therefore the hardness of gas bag 16 can be adjusted to the load condition that exists at a given moment, in this way protecting the vehicle occupant from unnecessary injury.

Figure 3:
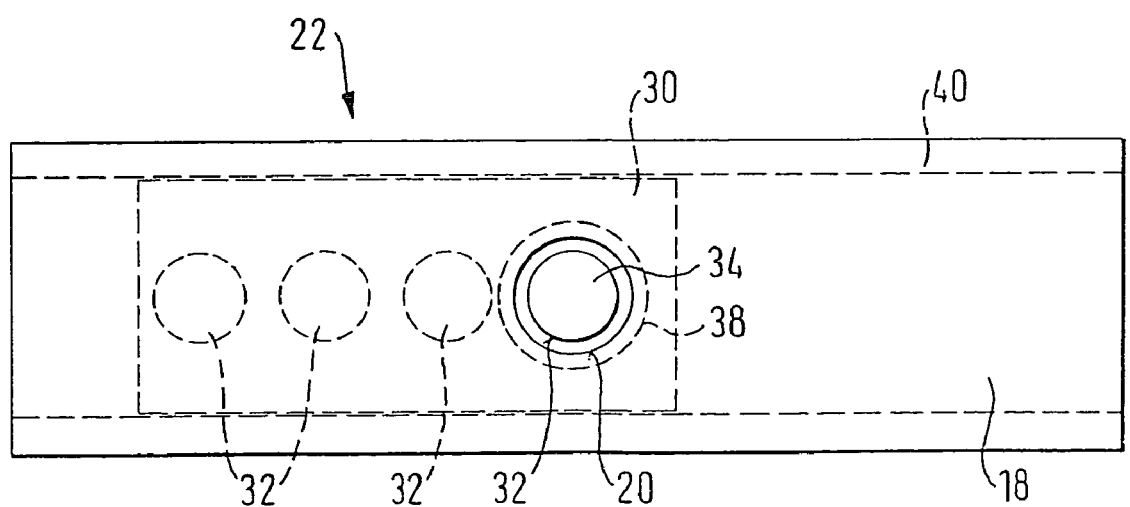
FIG. 3 depicts a lateral view of a vehicle occupant restraint device according to a second embodiment of the present invention.

FIG. 3 shows an alternative embodiment of closing device 22, in which the identical components bear the identical reference numbers, only the differences with respect to the first embodiment being discussed below. In closing device 22 according to FIG. 3, plate 30 is realized in an oblong, rectangular shape and is attached to generator support 18 by guide rails 40 such that, by laterally shifting plate 30, individual openings 32, which are covered by diaphragms 34, can be placed over larger discharge opening 20 in the side wall of generator support 18. In this way, the hardness of gas bag 16 can be regulated in accordance with the load condition, while maintaining an especially compact construction.

The invention claimed is:

1. A vehicle occupant restraint device having a gas bag module (12), comprising
   a gas generator (14) for inflating a gas bag (16),
   at least one discharge opening (20) that is formed in a rigid component of said gas bag module (12), through which gas that is produced by said gas generator (14) and conveyed into said gas bag (16) can be discharged, and
   at least one closing device (22) for said discharge opening (20), which has an adjusting device and a plurality of covers of different pressure sensitivities,
   a specific one of said covers being placed in front of said discharge opening (20) by said adjusting device even before said gas bag module (12) is activated, so as to close said discharge opening (20) until a pre-established gas bag interior pressure is reached that is associated with the specific cover, and, when this interior pressure is exceeded, to at least partially release said discharge opening through bursting.

2. The vehicle occupant restraint device as recited in claim 1, wherein at least one sensor (28) is provided, which detects one of vehicle- and occupant-specific parameters, and a control unit (26) that processes said parameters and drives said adjusting device.

3. The vehicle occupant restraint device as recited in claim 1, wherein said covers are produced so as to have different thicknesses.

4. The vehicle occupant restraint device as recited in claim 1, wherein said covers have the same pre-established bursting cross-sections of said covers.

5. The vehicle occupant restraint device as recited in claim 1, wherein said closing device (22) has a plate (30) with a plurality of openings (32), which are closed by an assigned cover before said respective gas bag interior pressure is reached.

6. The vehicle occupant restraint device as recited in claim 5, wherein a respective cover is placed in front of said discharge opening (20) by moving said plate (30).

7. The vehicle occupant restraint device as recited in claim 5, wherein said plate (30) is moved by said adjusting device in a rotational direction.

8. The vehicle occupant restraint device as recited in claim 5, wherein said plate (30) is moved by said adjusting device in a translational direction.

9. The vehicle occupant restraint device as recited in claim 1, wherein said adjusting device is a mechanism (24).

10. The vehicle occupant restraint device as recited in claim 1, wherein said closing device (22) has at least one seal (38).

11. The vehicle occupant restraint device as recited in claim 1, wherein each cover is made up of one individual material piece.

12. The vehicle occupant restraint device as recited in claim 1, wherein said covers are made of the same material.

* * * * *